United States Patent
Sivasubramaniam et al.

(10) Patent No.: US 7,732,966 B2
(45) Date of Patent: Jun. 8, 2010

(54) SUPERCONDUCTING HOMOPOLAR INDUCTOR ALTERNATOR FOR POWER APPLICATIONS

(75) Inventors: Kirubaharan Sivasubramaniam, Clifton Park, NY (US); Evangelos Trifon Laskaris, Schenectady, NY (US); James William Bray, Niskayuna, NY (US); James Michael Fogarty, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 821 days.

(21) Appl. No.: 11/254,140

(22) Filed: Oct. 19, 2005

(65) Prior Publication Data

US 2007/0085427 A1   Apr. 19, 2007

(51) Int. Cl.
H02K 55/06 (2006.01)
(52) U.S. Cl. .................................................. 310/178
(58) Field of Classification Search ................ 310/178, 310/102 A, 52, 54, 63, 168
See application file for complete search history.

(56) References Cited

U.S. PATENT DOCUMENTS

| | | | | |
|---|---|---|---|---|
| 4,385,251 A * | 5/1983 | Mallick et al. | ............... | 310/178 |
| 4,858,304 A * | 8/1989 | Weldon et al. | ................ | 29/598 |
| 5,385,011 A | 1/1995 | Stewart, Jr. | | |
| 5,451,825 A * | 9/1995 | Strohm | ........................ | 310/178 |
| 6,489,700 B1 * | 12/2002 | Heiberger et al. | ........... | 310/178 |
| 6,617,738 B2 * | 9/2003 | Dickinson | .................... | 310/178 |
| 6,940,200 B2 * | 9/2005 | Lopatinsky et al. | ......... | 310/178 |
| 2004/0239201 A1 * | 12/2004 | Sivasubramaniam et al. | ......................... | 310/178 |
| 2004/0262924 A1 | 12/2004 | Wacker | | |

FOREIGN PATENT DOCUMENTS

| DE | 10336792 | 3/2005 |
|---|---|---|
| EP | 1482628 | 1/2004 |
| WO | WO 02/24523 A2 | 3/2002 |

OTHER PUBLICATIONS

EP06255257 Search Report, Aug. 27, 2009.
Chinese Patent Application Office Action for Invention No. 200610146492.0, Oct. 13, 2009.

* cited by examiner

*Primary Examiner*—Dang D Le
(74) *Attorney, Agent, or Firm*—Penny A. Clarke

(57) ABSTRACT

A portable power system has a turbine engine generating mechanical energy. A homopolar electrical machine receives this energy. The homopolar electrical machine has a single stationary superconducting field coil configured to create a magnetic field. A homopolar rotor is configured to rotate within the magnetic field such that a rotating magnetic field is created in a stationary winding by interaction of the rotating permeance wave produced by the homopolar rotor and the magnetic field produced by the single stationary field coil. The homopolar electrical machine is configured as a generator and produces electrical power for the portable power system.

17 Claims, 6 Drawing Sheets

SUPERCONDUCTING HOMOPOLAR INDUCTOR ALTERNATOR FOR POWER APPLICATIONS

BACKGROUND OF THE INVENTION

The disclosed systems generally relate to the application of electrical motors/generators and more particularly to homopolar machines including superconducting windings.

Historically, most superconducting electric machines have included a superconducting field coil installed on the rotor. The superconducting coil is maintained at a temperature approaching zero Kelvin using a continuous supply of cryogenic fluid such as, but not limited to, helium (He). If a high temperature superconductor (HTS) is used in fabricating the field coil, a cryogenic fluid such as nitrogen ($N_2$) may be used to achieve superconducting temperatures. The cryogenic fluid is typically supplied to the superconducting field coil from a stationary cryocooler through a transfer coupling that is coupled to one end of the rotor. The transfer coupling channels the cryogenic fluid from a stationary portion to a rotating portion on the rotor. The cryogenic fluid is then routed through a cooling loop thermally coupled to the superconducting field coil and then back to the transfer coupling for return to the stationary cryocooler.

The superconducting field coil is subjected to thermal stresses, centrifugal stresses, and is provided with an electrical connection through the rotor to power the superconducting field coil. Accordingly, designing, fabricating and operating such a rotor may be difficult. For example, the superconducting coils, especially HTS coils, may be sensitive to mechanical strain. Specifically, because the coils are coupled to the rotor, the coils may be subjected to centrifugal forces that may cause strains and degrade the performance of the superconductor. In addition, because the coil is maintained at a cryogenic temperature, an elaborate support system may be needed to maintain the coil in position against the centrifugal forces while preserving the integrity of the thermal insulation between the coil and the parts of the rotor at ambient temperature. Further, the performance of these machines limits the application of the same.

Problematic areas where an electromechanical applications of energy conversion are required are portable military auxiliary power for land, air or sea based platforms, where a portable turbine drives the generator. The high power density sought requires a high speed machine, with a rugged rotor. An electric ship drive motor and generator provide power for propulsion, which has high power density, high efficiency and can be driven directly or through a gearbox. Other applications include: Ship auxiliary power (High power density, high efficiency requirement); Hydrogenerator (High efficiency required and usually low speed); Wind generator (high power density required with very low speed); Frequency shifter (generator with controlled low frequency ac in field winding to generate constant frequency power for varying turbine speed).

BRIEF DESCRIPTION OF THE INVENTION

In one aspect, a machine for generating electricity using a stationary superconducting field coil and a stationary stator winding is provided. The apparatus includes creating a magnetic field with the field coil, rotating a homopolar rotor within the magnetic field such that a rotating magnetic field is created in the stationary stator winding by an interaction of a rotating permeance wave produced by the rotating rotor and the magnetic field produced by the stationary field coil. This machine provides power for but is not limited to portable power systems, electric ship drive motors and generators and auxiliary power systems.

The above described and other features are exemplified by the following figures and detailed description.

BRIEF DESCRIPTION OF THE DRAWINGS

Referring now to the figures wherein the like elements are numbered alike.

DETAILED DESCRIPTION OF THE INVENTION

Figure 1:
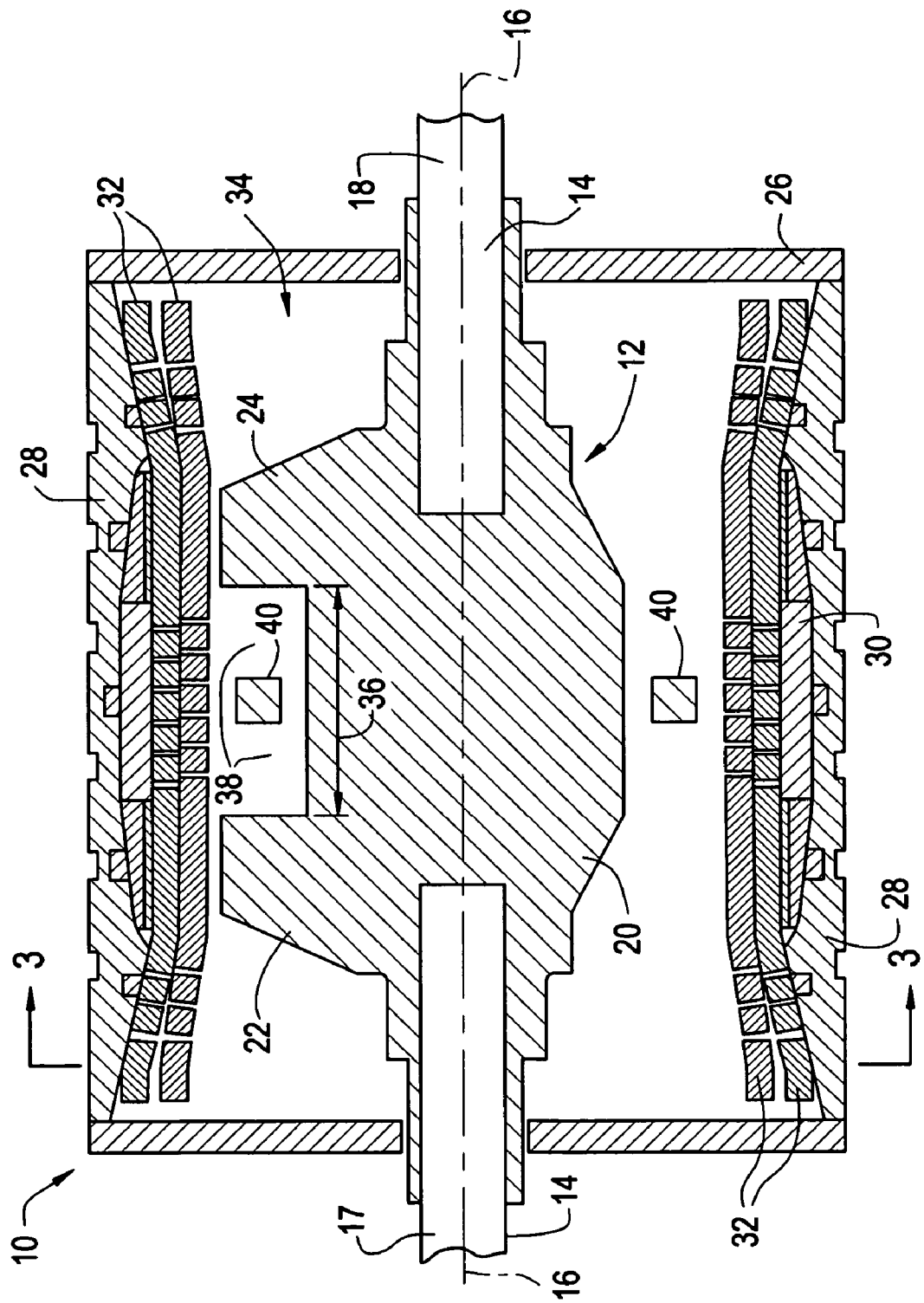
FIG. 1 is a partial cross-sectional side view of an exemplary embodiment of a homopolar electrical machine.

FIG. 1 is a side partial cross-sectional view of an exemplary embodiment of a homopolar electrical machine 10 that includes a rotor 12 with a shaft 14 having a longitudinal axis 16. Rotor 12 is rotatable about axis 16. In the exemplary embodiment, shaft 14 is segmented such that a first shaft stub 17 and a second shaft stub 18 form shaft 14. Rotor 12 also includes a pole piece assembly 20 that includes a plurality of first pole pieces 22 that are separated axially on pole piece assembly 20 from a plurality of second pole pieces 24. In an alternative embodiment, rotor 12 is formed as a single monolithic structure that includes first pole pieces 22 and second pole pieces 24, axially separated and coupled to shaft 14. In another alternative embodiment, pole piece assembly 20, first pole pieces 22 and/or second pole pieces 24 are integrally formed with shaft 14 to define a monolithic rotor. In the exemplary embodiment, only one pole piece assembly 20 is illustrated. It should be understood that any number of pole piece assemblies 20 may be coupled together in tandem to define a rotor 12. Additionally, it should be understood that in the monolithic shaft 14 embodiment, any number of pole piece sets may be coupled to shaft 14 to define rotor 12. In an alternative embodiment, each plurality of homopolar pole pieces 22, 24 includes an additional row of a plurality of homopolar pole pieces (not shown) to improve dynamic performance. Each additional row of the plurality of pole pieces are displaced axially with respect to shaft 14 from each plurality of pole pieces 22, 24.

Rotor 12 is rotatably supported by a casing 26 that also houses a stator core 28 and stator yoke 30. A plurality of stator windings 32 are positioned in axial channels defined within core 28. Casing 26 is substantially cylindrical and includes a bore 34 extending therethrough. Rotor 12 is positioned partially within bore 34.

An axial separation distance 36 extending between first pole pieces 22 and second pole pieces 24 defines an air gap 38 between a field coil 40 and first pole pieces 22 and between field coil 40 and second pole pieces 24. In the exemplary embodiment, field coil 40 is positioned within a cryostat (not shown) that is coupled to stator core 28. Coil 40 is mechanically decoupled from rotor 12, and in the exemplary embodiment, is supported by stationary coil supports (not shown). In an alternative embodiment field coil 40 may be coupled to the rotor 12. Field coil 40 is fabricated from a superconducting material such that when cooled to superconducting temperatures, field coil 40 exhibits substantially zero resistance to electrical current flow.

In operation, machine 10 operates as an electrical generator or motor. Rotor 12 is rotated about axis 16 by a torsional force applied to it by a prime mover (not shown) coupled to shaft 14. An electrical current is supplied to stationary superconducting field coil 40. The electrical current generates a magnetic field surrounding field coil 40. Ferromagnetic shaft 14 passes through the axis of field coil 40, and therefore is magnetically coupled to field coil 40. The orientation of field coil 40 and first and second pole pieces 22 and 24 creates an interaction between the magnetic field of coil 40 and a permeance wave of the rotating ferro-magnetic poles 22 and 24 such that first pole pieces 22 are magnetized to a first polarity, North, for example, and such that second pole pieces 24 are magnetized to a second polarity, South, for example. The rotating homopolar magnetic field is magnetically coupled to stator windings 32.

In the exemplary embodiment, field coil 40 is stationary with respect to rotor 12 such that a relative difference in rotational speed between rotor 12 and the magnetic field generated by field coil 40 is the rotational speed of rotor 12.

Figure 2:
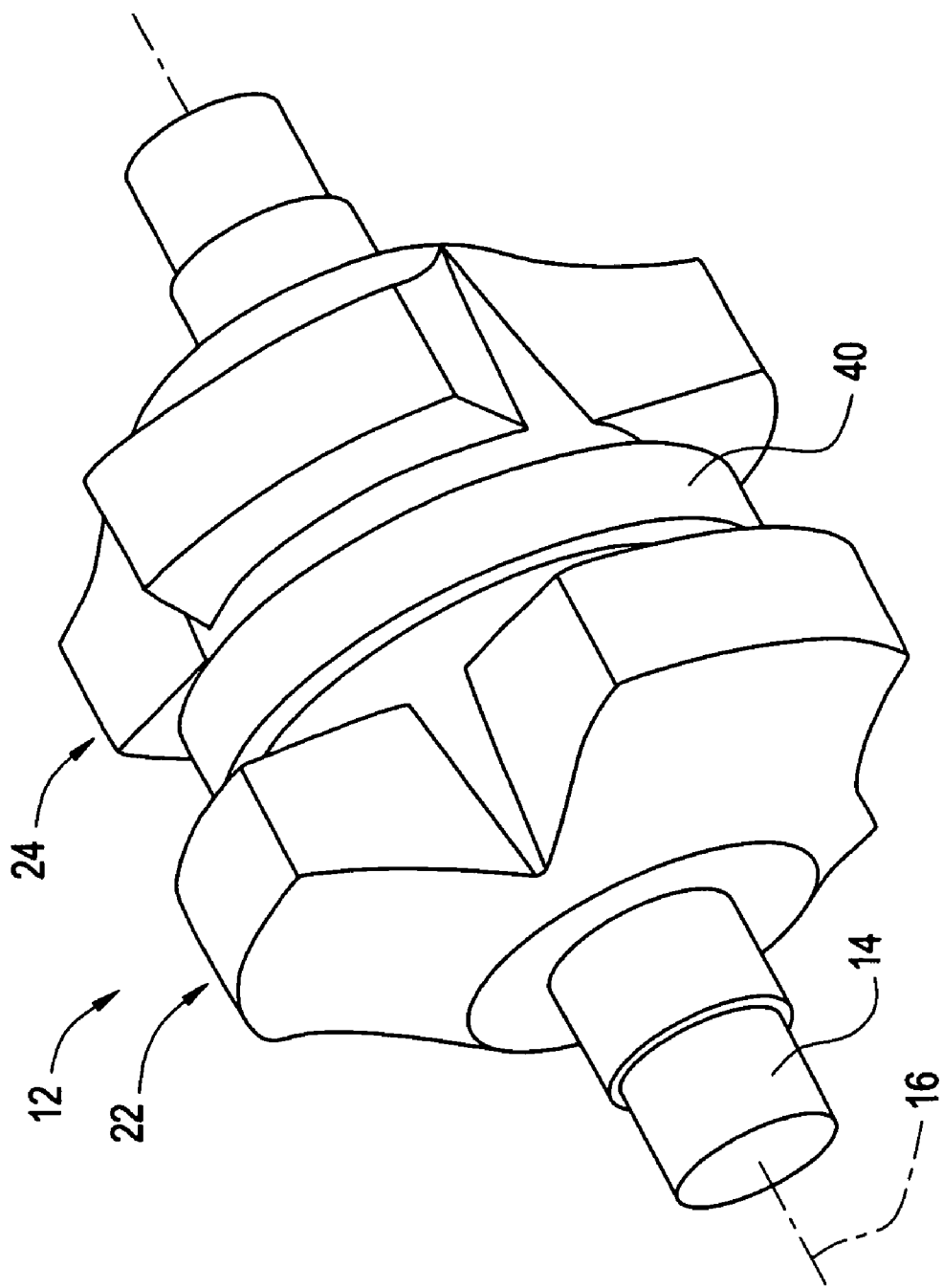
FIG. 2 is a perspective view that illustrates an exemplary rotor that may be used with the machine shown in FIG. 1.

FIG. 2 is a perspective view that illustrates an exemplary rotor 12 that may be used with machine 10 (shown in FIG. 1). Rotor 12 includes shaft 14, first pole pieces 22 and second pole pieces 24. Pole pieces 22 and 24 define a pole set. The rotor configuration is homopolar such that the plurality of first pole pieces 22 have the same generated magnetic polarity, and the plurality of second pole pieces 24 also have the same generated magnetic polarity. In the exemplary embodiment, each of the plurality of first pole pieces 22 corresponds to a respective one of the plurality of second pole pieces 24. For example, rotor 12 is shown in FIG. 2 as including only three pole pieces in each of the plurality of first pole pieces 22 and the plurality of second pole pieces 24. However alternatively, each first pole piece 22 is offset angularly in the direction of rotation of rotor 12 from a respective corresponding one of the second pole pieces 24 by approximately one pole-pitch. The offset of poles 22 and 24 defines a rotating magnetic field of varying magnitude and reversing polarity to stator windings 32, which facilitates generating an alternating electrical output, for example, a sine wave from machine 10.

In operation, an electrical current is supplied to stationary superconducting field coil 40. Current flowing through the superconducting conductors of coil 40 generates a magnetic field surrounding coil 40. First pole pieces 22 and second pole pieces 24 rotate proximate to coil 40 and are magnetically coupled to coil 40. The interaction of the magnetic field generated by coil 40 and the permeance wave of the rotating ferro-magnetic pole pieces 22 and 24 of rotor 12 produces a rotating magnetic field with first pole pieces 22 oriented at a first magnetic polarity (e.g., North), and second pole pieces 24 oriented at a second magnetic polarity (e.g., South). The magnetic lines of flux from pole pieces 22 and 24 pass through stator windings 32 (shown in FIG. 1) and generate a current flow in stator windings 32.

Figure 3:
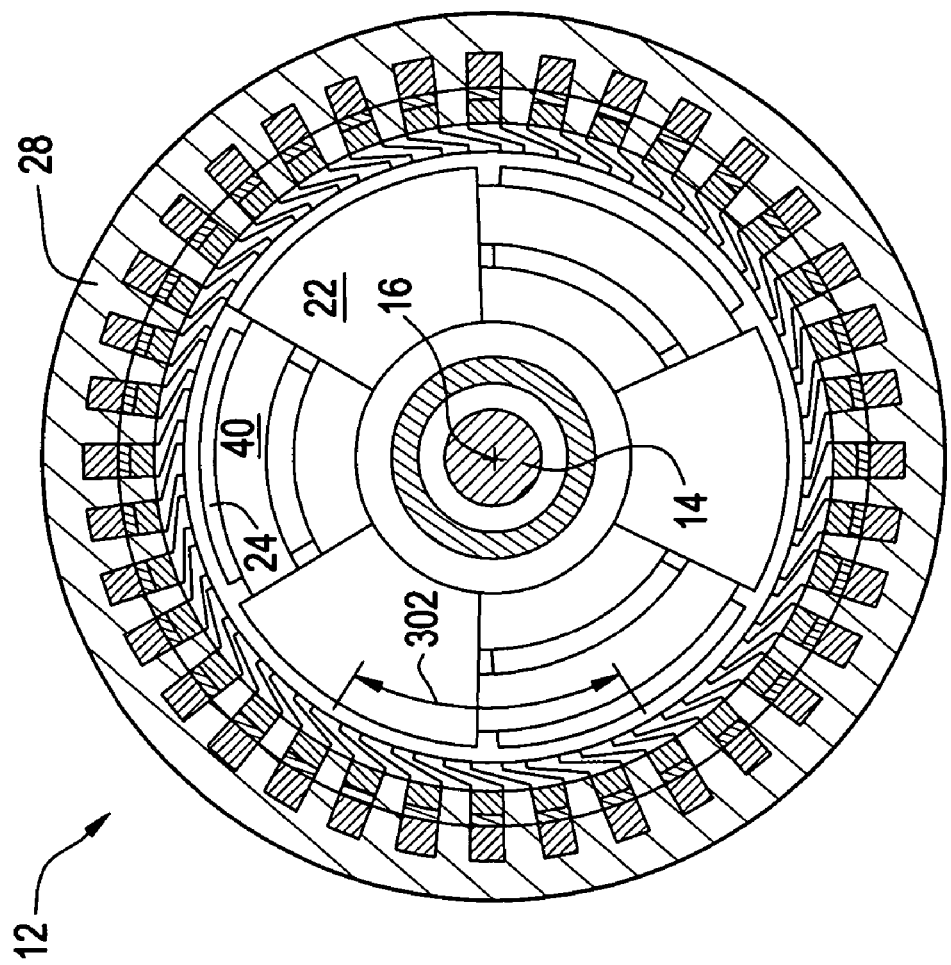
FIG. 3 is a cutaway end view of the rotor shown in FIG. 2 taken along Line 3-3 shown in FIG. 1.

FIG. 3 is a cutaway end view of rotor 12 taken along line 3-3 shown in FIG. 1. Angle 302 represents an angular offset between the first pole pieces 22 and second pole pieces 24. In the exemplary embodiment, angle 302 represents an angular offset of approximately one pole pitch.

Figure 4:
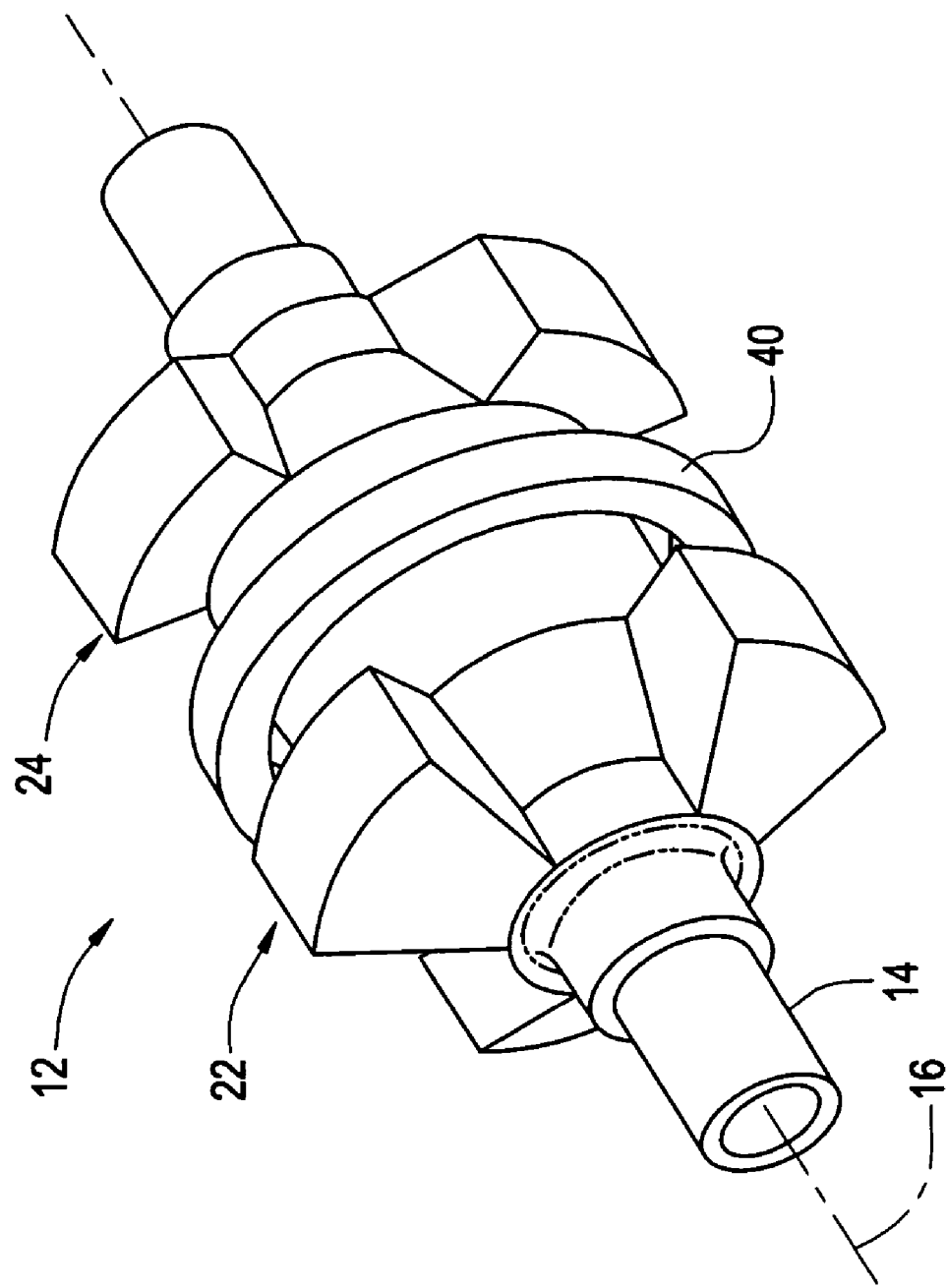
FIG. 4 is a perspective view that illustrates an alternative exemplary rotor that may be used with the machine shown in FIG. 1.

FIG. 4 is a perspective view that illustrates an alternative exemplary rotor 12 that may be used with machine 10 (shown in FIG. 1). In the alternative embodiment, each of first pole pieces 22 is inline with a corresponding respective second pole piece 24. Field coil 40 generates a magnetic field that interacts with each of first pole pieces 22 and each of second pole pieces 24 to generate a magnetic pole of a first polarity in each of first pole pieces 22 and to generate a magnetic pole of a second opposite polarity in each of second pole pieces 24. In the exemplary embodiment, stator windings 32 are offset by approximately one pole-pitch to generate aiding currents in stator windings 32. For example, if stator windings 32 were substantially axially positioned in stator core 28, the magnetic field of first pole pieces 22 would generate a current of a first polarity in stator windings 32 and second pole pieces 24 would generate current of a second opposite polarity in each winding of stator winding 32. The net result of opposing current flow in each winding of stator windings 32 would be substantially zero current flow in stator windings 32. Therefore, each pole piece of first pole pieces 22 and each respective pole piece of second pole pieces 24 are offset approximately one pole pitch to facilitate eliminating generating opposing currents in stator windings 32.

Figure 5:
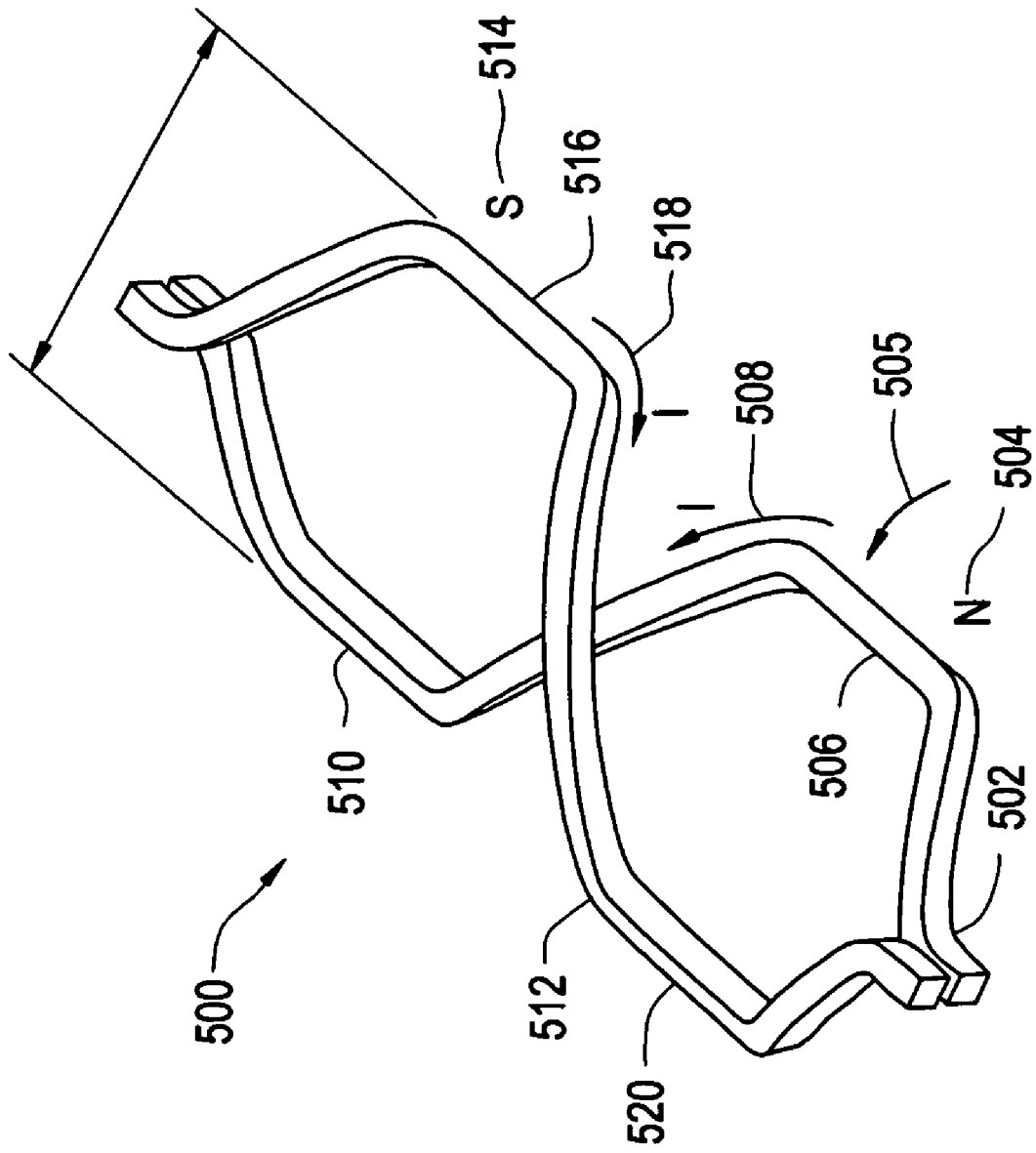
FIG. 5 is a partial cutaway perspective view of an exemplary pair of windings that may be used in the machine when using the alternative embodiment of the rotor shown in FIG. 4.

FIG. 5 is a partial cutaway perspective view of an exemplary pair of windings 500 that may be used in machine 10 when using the alternative embodiment of rotor 12 shown in FIG. 4. A first winding 502 is illustrated with a North polarity pole 504 passing in direction 505 proximate a first portion 506 of winding 502. A current 508 is generated in first winding 502 from the interaction of the rotating North magnetic pole 504 and winding 502. First winding 502 is channeled approximately one pole pitch away from portion 506 to portion 510, which is located proximate to a space between second pole pieces 24. With no pole pieces proximate portion 510, there is substantially zero current generated in portion 510, therefore current flows through winding 502. Similarly, a second winding 512 is illustrated with a South polarity pole 514 passing in direction 505 proximate a first portion 516. A current 518 is generated in second winding 512 from the interaction of the rotating magnetic pole 514 and winding 512. Second winding 512 is directed one pole pitch away from portion 516 to portion 520, which is located proximate a space between first pole pieces 24. With no pole pieces proximate portion 520, there is substantially zero current generated in portion 520, therefore current flows through winding 512.

The above-described methods and apparatus provide a cost-effective and reliable means for generating electricity using a stationary field coil and a homopolar rotor. More specifically, the methods and apparatus facilitate utilizing a superconducting field coil that is stationary with respect to the machine rotor. As a result, the methods and apparatus described herein facilitate generating electrical power in a cost-effective and reliable manner.

Furthermore, many advantages result from positioning field coil 40 mechanically separate from rotor 14 and maintaining coil 40 stationary, including facilitating making machine 10 simple and reliable. For example, a stationary field coil does not experience relatively large centrifugal forces that may be produced in a rotating field coil, therefore facilitating simplifying a coil support assembly. Thermal insulation between the stationary field coil and ambient temperature may be fabricated more simply due to reduced requirements on the field coil support. In the absence of relatively large forces acting on the field coil, the resulting strains in the superconducting coil may be less, producing a more reliable HTS coil. With a stationary coil circumscribing the rotor, the field coil may be designed as a simpler solenoid coil rather than a more complicated "racetrack" coil. The cryostat cooling a stationary field coil is also stationary, facilitating a simpler cryostat design. For example, a complicated transfer coupling is not needed to direct a cooling medium into the rotating cooling circuit; a simple direct cooling connection may be used. The coil may, instead, be cooled in one of the established, more reliable ways of cooling, including conduction cooling. A vacuum, desirable for thermal insulation may be made stationary, facilitating simpler and more reliable fabrication and assembly. Similarly, other portions of the insulation system may be made more reliable without having to consider relatively large centrifugal forces. There is no need for a slip-ring assembly to transfer current to the field coil from a stationary exciter. The voltage across the coil is then more predictable and makes it easier to detect, quench and protect the coil with a reliable stationary protection circuit. Additionally there is no need to consider rotating brushless exciters.

Figure 6:
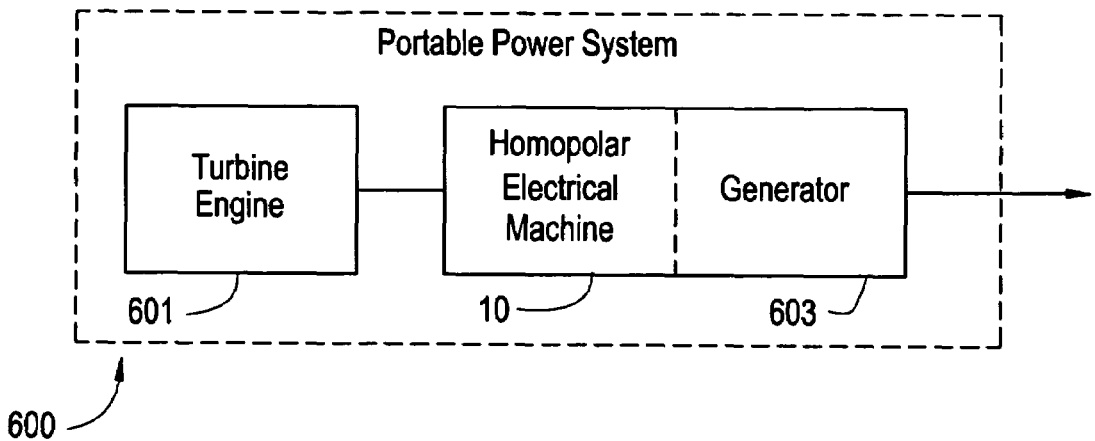
FIG. 6 is a top level block diagram view of an exemplary application of the homopolar electrical machine depicted as a portable power system.

FIG. 6 is a schematic block diagram illustrating an exemplary application of the homopolar electrical machine embodiment 10 depicted in FIGS. 1 through 5. In particular, system 600 depicts a portable power system, such as may be found, for example in (military) land, marine or airborne based platforms. As is shown, the system 600 includes a turbine engine 601 connected in line with a homopolar electrical machine 10 configured as an electrical generator 603. An example of an electrical generator is a multi-mega watt generator that generates power from 2 to 40 MW at 3600 or higher rpm system.

Figure 7:
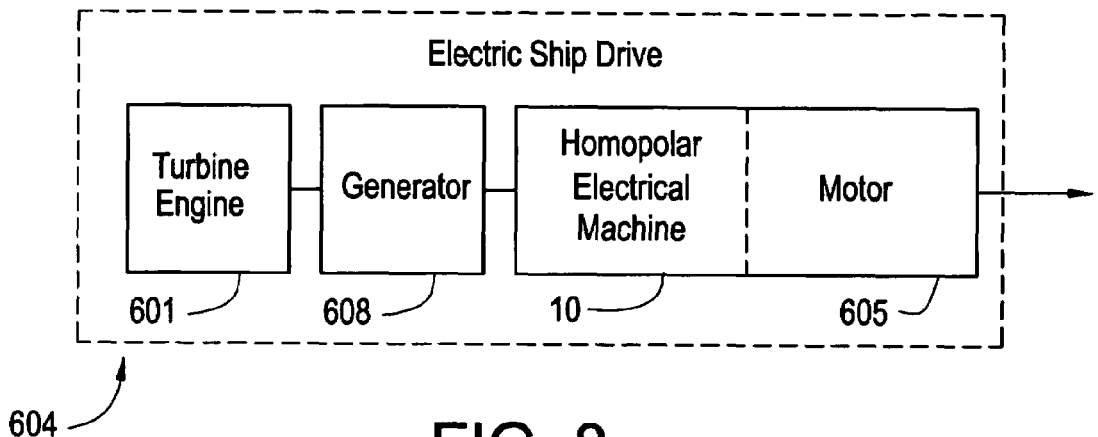
FIG. 7 is a top level block diagram view of an exemplary application of the homopolar electrical machine depicted as an electric ship drive.
Figure 8:
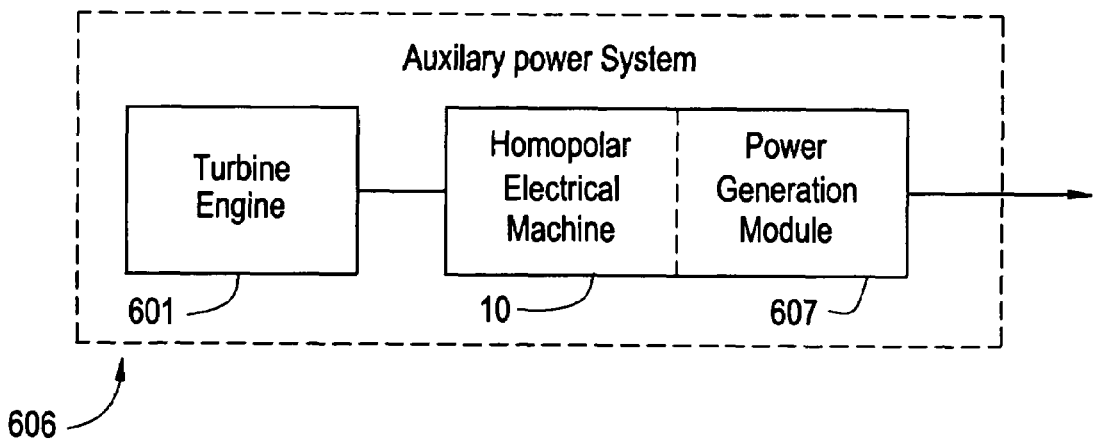
FIG. 8 is a top level block diagram view of an exemplary application of the homopolar electrical machine depicted as an auxiliary power system.

In addition, system 604, FIG. 7 depicts a ship propulsion system in which it provides power for the ship's drive system. A turbine engine 601 provides mechanical power to a generator 608, which provides power to a homopolar electrical machine 10 configured as a motor 605. The generator 608 may, if desired, be a homopolar machine 10 configured as a generator. The homopolar electrical machine 10 discussed above provides the source of power for propulsion of the ship.

In still another application, system 606 depicts an auxiliary power system (e.g., such as may be found in a shipboard, vehicle, or airplane environment), including a turbine engine 601 connected to a homopolar electrical machine 10 configured as a power generation module 607. The power module may, if desired, be several MW in power. The system 606 is designed to power a ring distribution three-phase AC system or other types of power conditioning modules. The AC and DC service loads may be powered from the same ring via appropriate transforms and/or power electronic converters.

Exemplary embodiments of electrical generating systems are described above in detail. The systems are not limited to the specific embodiments described herein, but rather, components of each system may be utilized independently and separately from other components described herein. Each system component can also be used in combination with other system components.

One of the principal advantages of the high-speed homopolar electrical machine 10 is that high frequency is being supplied to the magnetic circuits of the connected transformers. This has the effect of reducing size and weight of the system.

The high frequency AC may then be converted to DC as required. High frequency electricity is the preferred energy source for advanced high-powered radar and direct energy weapons.

While the disclosure is in reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling with the scope of the appended claims.

What is claimed is:

1. A portable power system comprising:
   a turbine engine configured to generate mechanical energy;
   a homopolar electrical machine receiving said mechanical energy;
   said homopolar electrical machine further comprising a stationary winding and a single stationary superconducting field coil separated radially inward from the stationary winding, the single stationary superconducting field coil configured to create a magnetic field;
   a homopolar rotor configured to rotate within said magnetic field such that a rotating magnetic field is created in said stationary winding by interaction of a rotating permeance wave produced by said homopolar rotor and said magnetic field produced by said single stationary field coil;
   said homopolar electrical machine configured as a generator; and
   said generator producing electrical power for the portable power system.

2. A portable power system in accordance with claim 1 wherein said portable power system is land based.

3. A portable power system in accordance with claim 1 wherein said portable power system is airborne based.

4. A portable power system in accordance with claim 1 wherein said portable power system is marine based.

5. A portable power system in accordance with claim 1 wherein said field coil is cooled.

6. A portable power system in accordance with claim 5 wherein said field coil is cooled to a predetermined cryogenic temperature.

7. A portable power system in accordance with claim 6 further comprises said field coil positioned within a cryostat.

8. A portable power system in accordance with claim 1 wherein said homopolar rotor includes a plurality of homopolar pole pieces spaced axially apart.

9. A portable power system in accordance with claim 8 wherein said homopolar rotor magnetically couples said stationary field coil axially between said homopolar pole pieces.

10. A portable power system in accordance with claim 8 wherein each pole piece of a first polarity is circumferentially offset by about one pole pitch from each respective pole piece of a second polarity.

11. A portable power system in accordance with claim 10 wherein said second axially oriented portion is displaced circumferentially about one pole pitch from said first axially oriented portion.

12. A portable power system in accordance with claim 11 wherein said pole pieces are formed into tandem pole piece sets.

13. An auxiliary power system for marine applications comprising:
- a turbine engine configured to generate mechanical energy;
- a homopolar electrical machine receiving said mechanical energy;
- said homopolar electrical machine further comprising a stationary winding and a single stationary superconducting field coil separated radially inward from the stationary winding, the single stationary superconducting field coil configured to create a magnetic field;
- a homopolar rotor configured to rotate within said magnetic field such that a rotating magnetic field is created in said stationary winding by interaction of a rotating permeance wave produced by said homopolar rotor and said magnetic field produced by said single stationary field coil;
- said homopolar electrical machine configured as a power generation module; and
- said power generation module producing electrical power for the auxiliary power system.

14. An auxiliary power system for marine applications in accordance with claim 13 wherein said power generation module generates power for radar.

15. An auxiliary power system for marine applications in accordance with claim 13 wherein said power generation module generates power for directed energy weapons.

16. An auxiliary power system for marine applications in accordance with claim 13 wherein said power generation module generates power for ship utilities.

17. An auxiliary power system for marine applications in accordance with claim 13 wherein said power generation module generates power for ship auxiliaries.

* * * * *